(12) United States Patent
Al Mueen et al.

(10) Patent No.: US 8,972,415 B2
(45) Date of Patent: Mar. 3, 2015

(54) SIMILARITY SEARCH INITIALIZATION

(75) Inventors: Abdullah Al Mueen, Seattle, WA (US); Krishnamurthy Viswanathan, Mountain View, CA (US); Chetan Kumar Gupta, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 13/460,015

(22) Filed: Apr. 30, 2012

(65) Prior Publication Data

US 2013/0290350 A1 Oct. 31, 2013

(51) Int. Cl.
*G06F 17/30* (2006.01)

(52) U.S. Cl.
USPC .......... 707/749; 707/706; 707/711; 707/780; 707/797; 715/236; 715/210; 715/700

(58) Field of Classification Search
CPC .............. G06F 17/30946; G06F 17/30961; G06F 17/27; G06F 17/274
USPC .......... 707/749, 706, 711, 780, 797; 715/236, 715/210, 700
See application file for complete search history.

(56) References Cited

U.S. PATENT DOCUMENTS

| | | | |
|---|---|---|---|
| 5,511,159 A * | 4/1996 | Baker et al. ................... | 715/700 |
| 5,799,299 A * | 8/1998 | Fujiwara ................... | 1/1 |
| 6,098,034 A * | 8/2000 | Razin et al. ................... | 704/9 |
| 6,778,981 B2 | 8/2004 | Lee et al. | |
| 7,433,527 B2 | 10/2008 | Takayama et al. | |
| 7,490,107 B2 | 2/2009 | Kashino et al. | |
| 7,533,038 B2 | 5/2009 | Blume et al. | |
| 8,676,815 B2 * | 3/2014 | Deng et al. ................... | 707/749 |
| 2005/0219075 A1 * | 10/2005 | Storer et al. ................... | 341/51 |
| 2008/0215546 A1 | 9/2008 | Baum et al. | |
| 2009/0234855 A1 * | 9/2009 | Hirsch et al. ................... | 707/6 |
| 2009/0304272 A1 | 12/2009 | Makadia et al. | |
| 2009/0307213 A1 * | 12/2009 | Deng et al. ................... | 707/5 |
| 2010/0125594 A1 * | 5/2010 | Li et al. ................... | 707/758 |

(Continued)

FOREIGN PATENT DOCUMENTS

| | | |
|---|---|---|
| JP | 2009163474 A | 7/2009 |
| WO | 2011050412 A1 | 5/2011 |

OTHER PUBLICATIONS

Luo et al., "Finding Aggregate Nearest Neighbor Efficiently without Indexing," Proceeding InfoScale '07, Proceedings of the 2nd international conference on Scalable information systems ICST (Institute for Computer Sciences, Social-Informatics and Telecommunications Engineering) ICST, Brussels, Belgium, Belgium 2007, article No. 48.

(Continued)

*Primary Examiner* — Dennis Truong
(74) *Attorney, Agent, or Firm* — North Shore Associates (57) ABSTRACT

A similarity search initialization system includes a leaf selector to select a leaf of a suffix tree generated from a target string representing a target sequence. The selected leaf is associated with a prefix in the suffix tree having a longest match to a suffix of a query string representing a query. The system further includes a distance module to determine a distance between the query and a subsequence of the target sequence represented by a candidate substring of the target string. The candidate substring includes the prefix associated with the selected leaf. The determined distance is to provide an initial upper bound in a similarity search of the target sequence using the query.

15 Claims, 3 Drawing Sheets

(56) References Cited

U.S. PATENT DOCUMENTS

| | | |
|---|---|---|
| 2011/0082877 A1 | 4/2011 | Gupta et al. |
| 2011/0119292 A1 | 5/2011 | Tsunoda et al. |
| 2012/0137367 A1* | 5/2012 | Dupont et al. .................. 726/25 |
| 2012/0209592 A1* | 8/2012 | Cherepanov et al. ............. 704/9 |
| 2013/0290350 A1* | 10/2013 | Mueen et al. ................. 707/749 |

OTHER PUBLICATIONS

Xing et al., "Early Prediction on Time Series: A Nearest Neighbor Approach," Proceedings of the Twenty-First International Joint Conference on Artificial Intelligence (IJCAI-09), 2009, pp. 1297-1302.

Gao et al., "Continuous Similarity-Based Queries on Streaming Time Series," IEEE Transactions on Knowledge and Data Engineering, vol. 17, No. 10, Oct. 2005, pp. 1320-1332.

* cited by examiner

SIMILARITY SEARCH INITIALIZATION

BACKGROUND

Data proliferation in recent times, both in terms of quantity and complexity, presents a variety of challenges. Among these challenges are searching for, locating, and then retrieving a designated piece or a specific subset of data within an enormous collection of often related but otherwise peripheral data. Database systems are devoted to this sort of data retrieval. In particular, database systems often excel at searching for an exact match for a particular request for data in a large collection of data and then retrieving the requested data. A related type of data search involves finding a best or closest match to a data request or query where an exact match may not exist. Data searches that involve locating a best or closest match to a query are often referred to as a similarity search or a nearest neighbor search. Similarity searches are often integral to activities including, but not limited to, data mining and related information retrieval, pattern recognition, computer learning and computer vision, genetic analysis and related analyses of various biomedical databases. Similarity searches also find application in performing other operations such as motif discovery, frequent pattern discovery, outlier discovery and rule discovery.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide a similarity search initialization. In particular, examples consistent with the principles described herein may provide an estimate of an initial upper bound associated with a metric employed in a similarity search. The initial upper bound may be employed in an initialization of the similarity search, according to various examples. In some examples, the upper bound may improve an overall speed of the similarity search by substantially reducing a number of possible matches that are examined, as well as substantially minimizing a computational cost associated therewith.

A similarity search, also called a nearest neighbor search, is a search that seeks to find a pattern in a set of data that provides a best match or represents a nearest neighbor to a query. In particular, given a target sequence T and a query Q, the similarity search attempts to find a subsequence in the target sequence T that is most similar (e.g., is a nearest neighbor) to the query Q. In general, a length of the query Q is much less than a length of the target sequence T (e.g., for T of length n, Q has length m where m<<n). A k-fold nearest neighbor search attempts to find a set of k nearest neighbors to the query. Further, the target sequence and query may be either single dimensional or multi-dimensional, according to various examples herein.

A similarity search may employ a metric to evaluate candidates when searching for a nearest neighbor of the query. According to various examples, the metric may include, but is not limited to, a Euclidean distance, a city block distance or taxicab distance, and various weighted distances. The Euclidean distance between two sequences P and Q is defined herein by equation (1) as $$d(P,Q) = \Sum_{i=1}^{m}(p_i - q_i)^2 \quad (1)$$

where m is a length of the sequences P and Q and where $p_i$ and $q_i$ are i-th elements in the sequences P and Q, respectively. In other examples, the Euclidean distance may be given by a square root of the expression in equation (1).

Herein, a sequence is a series or an ordered collection of elements (e.g., data elements, numbers, symbols, etc.). A time sequence is defined as a sequence in which the elements are related by time (e.g., temporal ordering). In particular, in a time sequence each element is related to every other element by a time difference. In a uniform time sequence, the time difference between each element is substantially constant.

Herein, a string is defined as a sequence of symbols having a finite length where the symbols are chosen from an alphabet. In particular, a string S of length n comprises a sequence of symbols $s_1, s_2, s_3, \ldots, s_n$ (e.g., $S=s_1 s_2 s_3 \ldots s_n$) where each symbol $s_i$ is a member of a set of symbols defined by the alphabet. In some examples herein, another string S\$ may be defined as comprising a concatenation of the string S and a special symbol '\$' that by definition is not a member of the alphabet of S. The special symbol '\$' is referred to as a terminal symbol of the string S\$. For example, the alphabet of S may comprise symbols in a set {A, B, C, ... Z} which does not include the terminal symbol '\$'.

Herein, a suffix is defined as a contiguous subset of the symbols of a string beginning at a j-th location in the string and continuing to an end of the string. For example, a j-th suffix $X_j$ for the string S of length n is given by the sequence $s_j, s_{j+1}, \ldots, s_n$ (e.g., $X_j = s_j s_{j+2} s_{j+3} \ldots s_n$). The set of all suffixes X comprises $\{X_j \text{ for all } j=1, 2, \ldots, n\}$, for example. In another example, the symbol sequence $s_j, s_{j+1}, \ldots, s_n$ defines the j-th suffix $X_j$ of the string S\$ (e.g., $X_j = s_j s_{j+2} s_{j+3} \ldots s_n$ \$). The terminal symbol \$ may be employed to insure that no suffix $X_j$ of S\$ is a prefix of another suffix $X_k$ in the string S\$, for example.

A substring of a string, by definition herein, is a string comprising a contiguous subset of symbols in the string. For example, a substring $S_1$ of the string S of length n may be given by a contiguous sequence of symbols $s_p, s_{p-1}, \ldots, s_r$ in S (e.g., $S_1 = s_p s_{p+1} \ldots s_r$, where p, r≤n). Similarly, a subsequence is a contiguous subset of elements of a sequence, by definition herein. For example, a subsequence $T_i^l$ of the sequence T may be given by a contiguous set of elements $\{t_i, t_{i+1}, \ldots, t_{i+l}\}$ in T (e.g., $T_i^l = t_i, t_{i+1}, \ldots t_{i+l}$). Herein by definition, when considering (e.g., for determining distance) a sequence T, a query Q of length m is always associated with a subsequence of the sequence T having a similar length m. Similarly, a query string $S_Q$ of length m is always associated with a substring having a corresponding length m, herein.

Herein, a data tree or a rooted directed tree is a hierarchical linked data structure that simulates branches of a tree comprising a plurality of nodes connected by edges (i.e., branches). Typically, a node referred to as a 'root' node acts as a base to the data tree to which all other nodes are connected either directly to the root node or to other nodes that provide a path to the root node. A terminal node (i.e., a node at an end of a branch) is referred to as a leaf node or simply a 'leaf', by definition herein. A combination of one or more edges and any intervening nodes that leads from the root node to another node (e.g., a leaf) is referred to as a 'path', by definition herein. A node along a path between a terminal node or leaf and the root is called an internal node. A sibling of a node (e.g., a leaf) in a data tree is a node that shares a common node with the node. For example, when considering a node A that is connected to another node B by an edge extending from node A to node B, node A is referred to as a parent of node B and node B is referred to as a child of node A. In a data tree, all nodes except the root node have a unique parent. By definition herein, a node C is a sibling of node B if both child nodes have the same parent (e.g., node A).

Herein, a suffix tree is defined as a data tree in which paths from the root to the leaves represent suffixes of a string in terms of a concatenation of labeled edges along the path. In particular, a suffix tree of the string S$ herein includes by definition a j-th leaf and an associated path from a root node to the j-th leaf corresponding to each of the j suffixes $X_j$, j=1. . . n+1, in the string S$, according to various examples. Moreover, the labeled edges of the suffix tree are labeled with portions of the string S$ such that a concatenation of the edge labels in the path from the root node to the j-th leaf provides the suffix $X_j$ associated therewith. Further, each internal node of the suffix tree has at least two children (e.g., each node in the suffix tree has at least one sibling) and no two edges emanating from a node have identical edge labels.

By definition herein, the longest common prefix of a pair of siblings in the suffix tree is the concatenation of labels along the path from the root to the parent of the pair of siblings. In other words, the longest common prefix or the 'longest match' is the prefix represented by the edge labels up to a node at which the siblings branch off from one another.

Further, as used herein, the article 'a' is intended to have its ordinary meaning in the patent arts, namely 'one or more'. For example, 'a suffix' means one or more suffixes and as such, 'the suffix' means 'the suffix(es)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Figure 1:
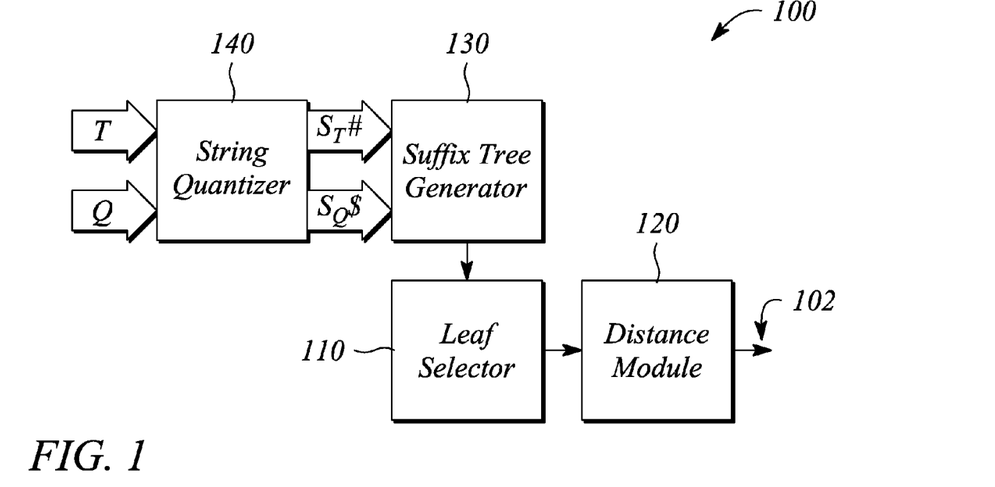
FIG. 1 illustrates a block diagram of a similarity search initialization system, according to an example consistent with the principles described herein.

FIG. 1 illustrates a block diagram of a similarity search initialization system 100, according to an example consistent with the principles described herein. The similarity search initialization system 100 receives a target sequence T and a query Q. In various examples, the similarity search initialization system 100 provides a value corresponding to an initial upper bound 102 to a smallest distance between the query Q and a subsequence of the similarity search. For example, the similarity search may employ the initial upper bound 102 during early abandonment when searching the target sequence T for a nearest neighbor of the query Q. The initial upper bound 102 may facilitate performing early abandonment during the similarity search substantially sooner than another upper bound, for example. In some examples, the similarity search initialization system 100 provides an initialization using the initial upper bound 102 that may increase an overall speed of the similarity search. In some examples (not illustrated), the similarity search system 100 may also return or provide a subsequence corresponding to the initial upper bound.

The similarity search initialization system 100 comprises a leaf selector 110. The leaf selector 110 is configured to select a leaf of a suffix tree that identifies or is associated with a prefix in the suffix tree having a longest match to a suffix of a query string. According to various examples, the suffix tree may be generated from and thus symbolizes suffixes of a target string. In some examples, the target string represents a sequence that is a target of the similarity search (i.e., the target sequence T). In addition, the query string represents a query of the similarity search (i.e., the query Q), in some examples.

According to various examples, the target sequence T may be substantially any sequence upon which a similarity search for a nearest neighbor of the query Q may be performed. For example, data of the target sequence T may be a sequence or series of substantially any data or set of data including, but not limited to, data represented as real numbers, binary numbers, alphanumeric characters, and various other symbols.

In some examples, the target sequence T is a time series or sequence. Data in a time sequence have or are related to one another according to a natural temporal ordering. For example, the target sequence T may comprise a sequence of real-valued data that were generated or sampled from a process, a signal or a similar evolving system as a function of time. In some examples, the time sequence comprises real-valued data representing uniformly time-sampled measurements (e.g., of a process, signal, etc.) in which the temporal ordering of the data is characterized by a consistent time difference between the measurements. In other examples, the target sequence T comprises data in another form including, but not limited to, a sequence of symbols or letters and a sequence of real-valued numbers that are not a time sequence. For example, the target sequence T may comprise a sequence of letters that represent a DNA code sequence. In various examples, the query Q has a same form as the target sequence T. In particular, the query Q represents a pattern that may be found or substantially matched in the target sequence T using the similarity search.

In some examples, the leaf selected by the leaf selector 110 (i.e., the selected leaf) is a leaf of the sub-tree rooted at the sibling (i.e., a sibling leaf) of a leaf representing the query string suffix. In some examples, the sibling leaf selected by the leaf selector 110 is a left-most sibling leaf of the leaf representing the query string suffix. Herein, a sibling leaf of a node is defined as a leaf of the subtree rooted at the sibling of the node, by definition. By definition herein, the 'left-most' sibling leaf is a sibling leaf of the leaf representing the query string suffix having an index or location in the target string that is closest to a beginning (i.e., the left) of the target string. In other examples, a right-most sibling leaf may be selected by the leaf selector 110 to be the selected leaf. By definition herein, the 'right-most' sibling leaf is a sibling leaf of the leaf representing the query string suffix having an index or location in the target string that is closest to an end (i.e., the right) of the target string. In yet other examples, another sibling leaf including, but not limited to, a middle sibling leaf and an arbitrarily chosen sibling leaf may be selected by the leaf selector 110 as the leaf associated with or having the longest prefix match to the query string suffix.

In some examples, the leaf selector 110 selects a plurality of leaves of the suffix tree. For example, the leaf selector 110 may select a sibling leaf associated with each of a plurality of suffixes of the query string. In some examples, the plurality of suffixes may comprise substantially all of the suffixes of the query string. As such, the leaf selector 110 may select a sibling leaf associated with each of the suffixes of the query string, for example. The selection thus results in a plurality of selected leaves, according to some examples.

According to various examples, the similarity search initialization system 100 further comprises a distance module 120. The distance module 120 is configured to determine a distance between the query Q and a subsequence of the target sequence T. A candidate substring of the target string represents the subsequence, according to various examples. The candidate substring, in turn, comprises the prefix associated with the selected leaf. In particular, the candidate substring is a substring of the target string that includes as a suffix the query string suffix, according to various examples. The distance determined by the distance module may provide or serve as the initial upper bound 102 in the similarity search of the target using the query Q, in some examples.

According to various examples, a candidate substring is a substring of the target string that begins at a position or a location in the target string given by the selected leaf (e.g., the left-most sibling leaf) minus a difference between a length of the query string and a length of the query string suffix. In some examples, a location given by the selected leaf is represented by an integer k while a length of the query string is represented by an integer m and a length of the query string suffix is represented by an integer l. In these examples, the candidate string location represented by an integer i is given by equation (2) as $$i = k - (m - l) \quad (2)$$

For example, the selected leaf may give a location 'k=4' in the target sequence T, the query string may have a length of three (m=3), and the query string suffix may have a length of one (l=1). In this example, the candidate substring is a substring of the target string that begins at location 'i=2' (e.g., i=4−(3−1)=2). In another example, the query string and suffix may have the same length in which case the candidate substring would begin at the location of or corresponding to the selected leaf (e.g., i=5−(3−3)=5).

In some examples, the distance is determined by the distance module 120 as the Euclidean distance. In other examples, another distance metric may be employed to determine the distance between the query Q and the target sequence subsequence. For example, the distance determination may employ a variety of distance metrics including, but not limited to, a city block distance metric and a weighted distance metric. In some examples, a k-fold nearest neighbor distance metric may be employed (e.g., for a similarity search of a multi-dimensional sequence).

In some examples, the distance module 120 is configured to determine the distance between the query string and each of a plurality of subsequences of the target sequence T. The plurality of subsequences corresponds to respective ones of a plurality of candidate substrings. Each candidate substring of the plurality, in turn, comprises a different one of a plurality of the prefixes associated with a corresponding plurality of selected leaves produced by the leaf selector 110 from or with respect to a plurality of different query string suffixes. For example, the query string may comprise suffixes 'ABA$', 'BA$' and 'A$'. A different candidate substring corresponding to each of these query string suffixes then includes the longest matching prefix (e.g., 'AB', 'BA' and 'A') of the related query string suffix, for example. Then a distance may be determined for each of the subsequences corresponding to each of the different candidate substrings. In some examples, the determined distance that provides the upper bound may be a minimum of the distances determined for the plurality of candidate substrings.

In some examples, the similarity search initialization system 100 further comprises a suffix tree generator 130. The suffix tree generator 130 is configured to generate the suffix tree. Suffix tree generator 130 may generate the suffix tree according to any of a variety of suffix tree generation algorithms. For example, the suffix tree generator 130 may employ Ukkonen's algorithm. Other algorithms including, but not limited to, McCreight's algorithm may be employed by the suffix tree generator 130 to generate the suffix tree, according to other examples.

According to some examples, the suffix tree generator 130 may be configured to generate the suffix tree from a concatenation of the target string and the query string. For example, the target string $S_T\#$ and the query string $S_Q\$$ may be concatenated to form a concatenated string $S_T\#S_Q\$$. The suffix tree generator 130 then generates a suffix tree using the concatenated string $S_T\#S_Q\$$. According to other examples, the suffix tree generator 130 may be configured to generate the suffix tree from the target string $S_T\#$ without including the query string.

Figure 2:
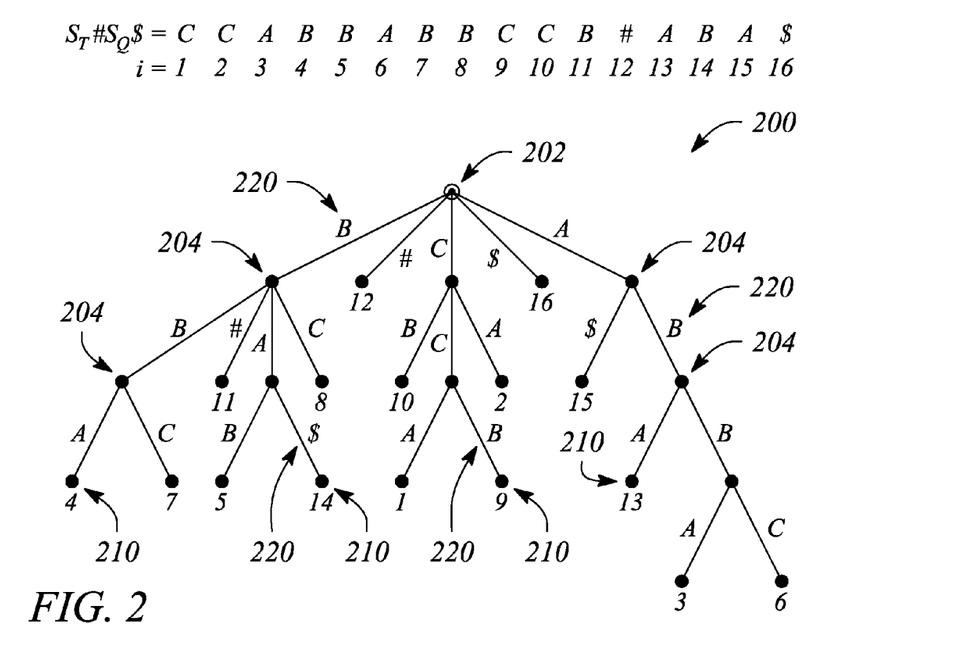
FIG. 2 illustrates a suffix tree, according to an example consistent with the principles described herein.

FIG. 2 illustrates a suffix tree 200, according to an example consistent with the principles described herein. In particular, FIG. 2 illustrates the suffix tree 200 generated using an example concatenated string $S_T\#S_Q\$$ given by the string 'CCABBABBCCB#ABA$' along with the example concatenated string $S_T\#S_Q\$$ itself. Numbers below the symbols in the example concatenated string $S_T\#S_Q\$$ illustrated in FIG. 2 denote locations of the respective symbols in the string. The suffix tree 200 comprises a root node 202 and a plurality of internal nodes 204. Also illustrated are leaves 210 (i.e., terminal nodes) and edges 220 of the suffix tree 200. The edges 220 connect an internal node 204 to the root 202, connect an internal node 204 to a leaf 210 or connect an internal node 204 to another internal node 204. Further in FIG. 2, each of the edges 220 is labeled with a symbol associated with a portion of a suffix illustrated by the edge 220 and each of the leaves 210 is labeled according to a corresponding location in the example concatenated string $S_T\#S_Q\$$ associated with or 'given by' the leaf 210.

By convention, the location given by a respective leaf 210 is a location in the example concatenated string $S_T\#S_Q\$$ at which a suffix produced through a concatenation of the edge labels leading from the root node 202 of the suffix tree 200 to the leaf 210 begins. Hence, a leaf 210 labeled '12' represents a suffix '#ABA$' of the example concatenated string $S_T\#S_Q\$$ that begins at location '12', for example. Note that in FIG. 2, terminal edges 220 are labeled with only a first symbol of the suffix portion associated with the terminal edge 220, for simplicity of illustration. For example, a terminal edge 220 at a leaf 210 giving location '13' is labeled with 'A' even though that particular terminal edge 220 actually represents the suffix portion 'A$'. In another example, a terminal edge 220 associated with a leaf 210 giving location '8' represents the suffix portion 'CCB#ABA$' while being labeled for simplicity of illustration with only 'C'.

Further illustrated in FIG. 2, are the leaves 210 that represent the suffixes of the query string $S_Q\$$. For example, leaves 210 labeled '13', '14' and '15' correspond to query string suffixes 'ABA$', 'BA$', and 'A$', respectively. A prefix having the longest match to each of these query string suffixes is, by definition, a prefix that is shared by the leaf 210 corresponding to the query string suffix and siblings of the leaf 210. For example, the prefix having the longest match with the leaf 210 labeled '13' in FIG. 2 is 'AB'. The prefix 'AB' is formed by a concatenation of edge labels of edges 220 leading from the root 202 of the suffix tree 200 to a node 204 that is a parent of the leaf 210 labeled '13'. In another example, the prefix having the longest match with the leaf 210 labeled '14' is 'BA'. The sibling leaf 210 of the leaf labeled '14' is the leaf 210 labeled '5'. In yet another example, the prefix having the longest match with the leaf 210 labeled '15' and its respective sibling leaves 210 labeled '3' and '6' is 'A', representing the edge 220 between the root 202 and the shared node 204.

With respect to the example illustrated in FIG. 2, as described above, the distance module 120 may compute a distance between the query and the subsequence of the target sequence T represented by each of the candidate substrings, according to some examples. When the leaf selector 110 selects a left-most sibling leaf 210, the selected leaves 210 may be the leaves labeled '3', '5' and '3' respectively for the leaves 210 labeled '13', '14' and '15' representing the three query string suffixes 'ABA$', 'BA$', and 'A$'. In turn, the candidate substrings corresponding to each of the leaves 210 labeled '13', '14' and '15' are 'ABB', 'BBA' and 'CCA', respectively. In particular, a first candidate substring 'ABB' (that corresponds to leaf 210 labeled '13') is a substring of the concatenated string $S_T\#S_Q\$$ that begins at location 'i=3'. A second candidate substring 'BBA' (that corresponds to leaf 210 labeled '14') is a substring of the illustrated concatenated string $S_T\#S_Q\$$ that begins at location 'i=4'; and a third candidate substring 'CCA' (that corresponds to leaf 210 labeled '15') is a substring of the illustrated concatenated string $S_T\#S_Q\$$ that begins at location 'i=1'. Note that in each of the above-described examples, the location 'i' may be given by equation (2), for example.

Referring again to FIG. 1, the similarity search initialization system 100 further comprises a string quantizer 140, according to some examples. In some examples, the string quantizer 140 is configured to convert the target sequence T into the target string $S_T\#$. In some examples, the string quantizer 140 is further configured to convert the query Q into the query string $S_Q\$$. In particular, the string quantizer 140 is configured to respectively convert the target sequence T and the query Q by mapping values in target sequence T and query Q into corresponding strings according to a symbolic aggregate approximation, according to various examples.

For example, the string quantizer 140 may divide a range of values taken on by members of the target and query sequences T, Q into a plurality of smaller contiguous ranges. The string quantizer 140 may then assign a symbol to each of the smaller contiguous ranges, for example. Each value in the target sequence T and the query Q is then represented in the corresponding target string and query string by a symbol associated with the smaller range that contains the value, for example. According to various examples, the string quantizer 140 employs a finite symbol alphabet to perform the conversion. For example, the plurality of smaller contiguous ranges may comprise three ranges and the finite symbol alphabet may include the symbols 'A', 'B', and 'C'. Each value in the target sequence T and the query Q is then represented in the corresponding target string and the query string by one of the symbols 'A', 'B', and 'C', for example.

Figure 3:
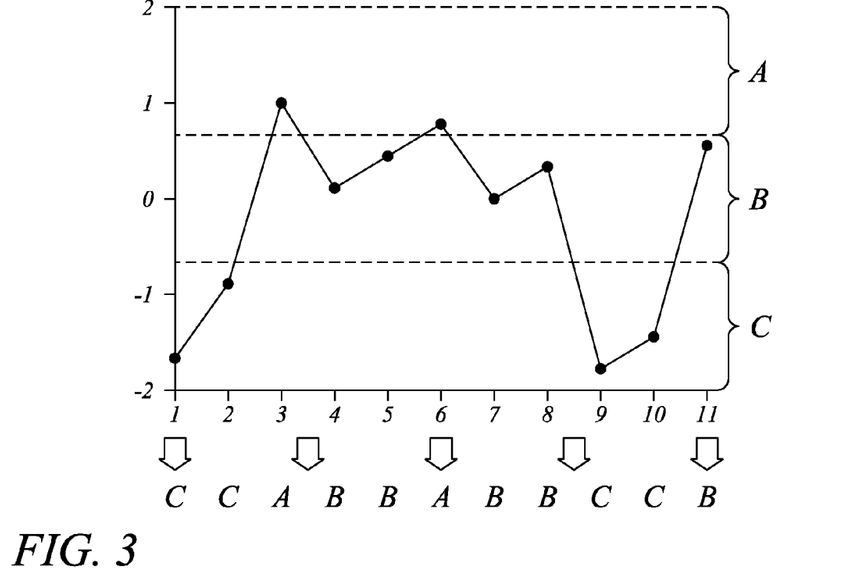
FIG. 3 illustrates a graphical representation of converting a sequence into a string, according to an example consistent with the principles described herein.

FIG. 3 illustrates a graphical representation of converting a sequence into a string, according to an example consistent with the principles described herein. In particular, FIG. 3 illustrates the conversion of an example target sequence illustrated by dots into an example target string 'CCABBAB-BCCB'. The smaller contiguous ranges are illustrated by horizontal dashed lines that divide the vertical axis into three regions, each region being labeled with one of three the symbols 'A', 'B', and 'C'. The horizontal axis is labeled with positions in the target sequence. When a value of the target sequence falls within one of the regions, a location in the target string corresponding to the value position in the target sequence is assigned the symbol for that region. The example target string 'CCABBABBCCB' produced from the example target sequence is illustrated below the horizontal axis in FIG. 3.

In some examples, the string quantizer 140 is further configured to add a termination symbol to an end of the string that is produced during the conversion to terminate the string. The termination symbol may be selected from a set of symbols that are not included in the finite symbol alphabet, according to various examples. Hence, the target string and the query string produced by the string quantizer 140 may each comprise a termination symbol. In some examples, the termination symbol of the target string is different from the termination symbol of the query string. For example, the target string $S_T\#$ constructed from a finite symbol alphabet comprising letters 'A', 'B', and 'C' may be terminated by a termination symbol '#' while the query string $S_Q\$$ may include a termination symbol '$'.

According to some examples, one or more of the leaf selector 110, the distance module 120, the suffix tree generator 130, and the string quantizer 140 are implemented as a hardware module. For example, the hardware module implementation may comprise an application specific integrated circuit (ASIC) that provides the functionality of the hardware module. According to other examples, one or more of the leaf selector 110, the distance module 120, the suffix tree generator 130, and the string quantizer 140 may be implemented as either a firmware module or a software module. The firmware module or software module may be stored in a memory and executed by a processor, for example.

In some examples, the similarity search initialization system 100 may be represented by an example function Init (T,Q) for the target sequence T of length n and the query Q of length m, defined in pseudocode as:

Init (T,Q):
    Convert the target sequence T to a target string $S_T\#$;
    Convert the query Q to a query string $S_Q\$$;
    Produce a concatenated string $S_T\#S_Q\$$;
    Generate a suffix tree from the concatenated string $S_T\#S_Q\$$;
    For every suffix $X_j$ of the concatenated string $S_T\#S_Q\$$
    where j = n+2, n+3, ..., n+m+1 do:
        For every sibling B of a leaf corresponding to the
        suffix $X_j$ do
            Set P to a left-most leaf of the subtree
            rooted at B;
            Set k such that the suffix $X_k$ ends at P;
            i ← k − (j − n − 2);
            if d($T_i^m$,Q) < D* then
                D* ← d($T_i^m$,Q);
                T* ← $T_i^m$;
            endif
        endFor;
    endFor;
Return T* where $T_i^m$ is a subsequence of the target sequence T beginning at location i and having length m; d($T_i^m$,Q) is a distance function that determines a distance between arguments $T_i^m$ and Q of the distance function; D* is a variable that receives the distance determined by the distance function; T* is a variable that receives a subsequence; P is a node in the suffix-tree of the concatenated string $S_T\#S_Q\$$; and B is a node of the suffix tree. In some examples, the distance function $d(T_i^m,Q)$ determines the Euclidean distance (e.g., given by equation (1) above). The function may be implemented as instructions that, when executed by the processor, provide similarity search initialization. The instructions may be stored in the memory of a computer system that includes the processor, for example. In another example, the instructions may be encoded on a non-transient computer readable medium (e.g., a computer disk, a thumb drive, an optical disc, etc.).

Figure 4:
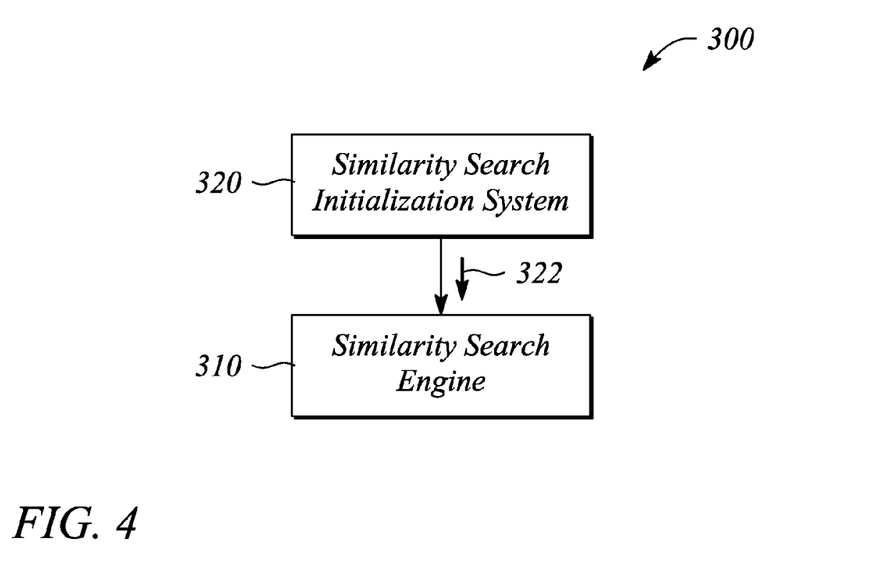
FIG. 4 illustrates a block diagram of a similarity search system, according to an example consistent with the principles described herein.

FIG. 4 illustrates a block diagram of a similarity search system 300, according to an example consistent with the principles described herein. The similarity search system 300 comprises a similarity search engine 310. The similarity search engine 310 is configured to perform a similarity search, according to various examples. In particular, the similarity search engine 310 is configured to search a target sequence T for a subsequence that is or best approximates a query Q. The nearest neighbor to the query Q is a subsequence of the target sequence T that minimizes a distance between the query Q and the subsequence. According to some examples, the distance may be the Euclidean distance while in other examples, another distance (e.g., city block distance, etc.) may be employed.

According to various examples, the similarity search engine 310 may determine the distance for a plurality of different subsequences of the target sequence T while searching for the nearest neighbor to the query Q. For example, the similarity search engine 310 may employ a brute force algorithm when searching for the nearest neighbor. In the brute force algorithm, substantially all subsequences in the target sequence T may be examined by the similarity search engine 310 to determine which of the subsequences may be a nearest neighbor to the query Q.

In some examples, similarity search engine 310 may employ a method that reduces a computational cost associated with determining the distance. For example, the similarity search engine 310 may employ early abandonment. In early abandonment, determining the distance may be terminated early (i.e., not completed) for a particular subsequence if a partially determined distance exceeds a threshold or upper bound on the minimum distance. The upper bound may be a smallest distance among the subsequences that have been examined so far, for example. In examples such as when using early abandonment, a good initial estimate of the upper bound can improve a speed of the similarity search performed by the similarity search engine 310.

In some examples, the similarity search engine 310 may employ an initial upper bound of the distance that is determined prior to beginning the similar search of the target sequence T. In particular, in some examples, the similarity search system 300 further comprises a similarity search initialization system 320 to provide the initial upper bound 322. In some examples, the similarity search initialization system 320 may be substantially similar to the similarity search initialization system 100 described herein. The similarity search engine 310 may employ the initial upper bound 322 to begin early abandonment at the start of a similarity search, for example. Specifically, the initial upper bound 322 may be employed to implement early abandonment during the distance determination, according to various examples.

Figure 5:
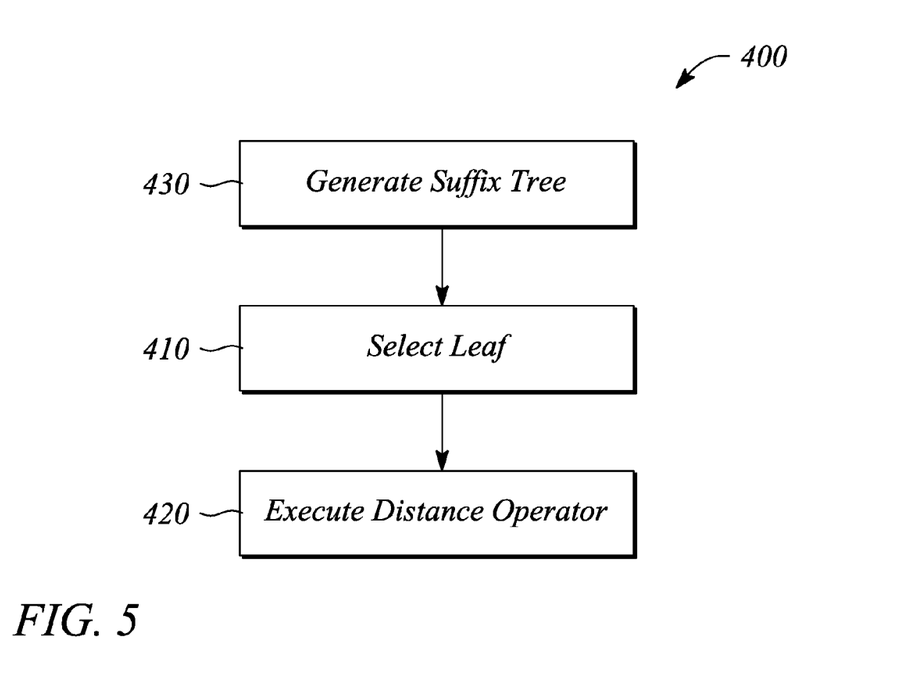
FIG. 5 illustrates a flow chart of a method of similarity search initialization, according to an example consistent with the principles described herein.

FIG. 5 illustrates a flow chart of a method 400 of similarity search initialization, according to an example consistent with the principles described herein. As illustrated, the method 400 comprises selecting 410 a leaf of a suffix tree. The selected leaf is associated with a prefix in the suffix tree having a longest match to a suffix of a query string. According to various examples, the suffix tree may be generated from a target string representing a target sequence. The target sequence may be stored in a memory, for example. According to various examples, the query string may represent a query. The query may be used to perform a similarity search of the target sequence, for example. In some examples, selecting 410 a leaf of a suffix tree may be performed by a leaf selector that is substantially similar to the leaf selector 110 described above with respect to the similarity search initialization system 100.

In particular, the selected leaf resulting from selecting 410 is a sibling of a leaf of the suffix tree representing the query suffix, according to some examples. In some examples, the selected leaf is a left-most sibling leaf. In other examples, the selected leaf is another sibling leaf including, but not limited to, a right-most sibling leaf, a middle sibling leaf and an arbitrarily chosen sibling leaf.

As is further illustrated in FIG. 5, the method 400 of similarity search initialization further comprises executing 420 a distance operator. The distance operator may be executed 420 using a processor (e.g., a processor of a computer system), for example. The distance operator, when executed 420, is configured to determine a distance between the query and a subsequence of the target sequence represented by a candidate substring of the target string. According to various examples, the candidate substring comprises a prefix associated with the selected leaf as a suffix. In some examples, when executed 420, the distance operator may be substantially similar to the distance module 120 described above with respect to the similarity search initialization system 100.

In particular, the candidate substring may be a substring of the target string that begins at a location in the target string given by the selected leaf minus a difference between a length of the query string and a length of the query string suffix, according to some examples. According to various examples, the determined distance is an initial upper bound in a similarity search of the target sequence using the query. In some examples, execution 420 of the distance operator determines the distance between the query and each of a plurality of subsequences of the target sequence corresponding to respective ones of a plurality of candidate substrings. In some examples, each candidate substring of the plurality comprises a different one of a plurality of the prefixes associated with a corresponding plurality of different query string suffixes. In these examples that result in multiple determined distances, the determined distance used as the upper bound may be a minimum of the distances determined for the plurality of candidate substrings, for example.

In some examples, the method 400 of similarity search initialization further comprises generating 430 the suffix tree. In some examples, the suffix tree is generated 430 from a string comprising the target string. In some examples, the string comprising the target string represents a concatenation of the target string and the query string. In some examples, generating 430 the suffix tree may be provided by a suffix tree generator that is substantially similar to the suffix tree generator 130 described above with respect to the similarity search initialization system 100.

In some examples (not illustrated), the method 400 of similarity search initialization further comprises quantizing the target sequence to produce the target string, for example when the target sequence is not already a string. For example, the target sequence may be quantized to convert a sequence of real-value data into a string. The target sequence may be a time sequence of real-valued data, for example. In another example, the target sequence may already be a string representing a DNA code sequence, for example. In some examples, the target string comprises a first termination symbol (e.g., '#') that is not represented in a finite symbol alphabet used in quantizing. In some examples (not illustrated), the method 400 of similarity search initialization further comprises quantizing the query to produce the query string. In some examples, the query string comprises a second termination symbol that is not in the finite symbol alphabet used in quantizing the query. The second termination symbol may be different from the first termination symbol, according to various examples. In some examples, quantizing the target sequence and quantizing the query may be provided by a string quantizer that is substantially similar to the string quantizer 140 described above with respect to the similarity search initialization system 100.

Figure 6:
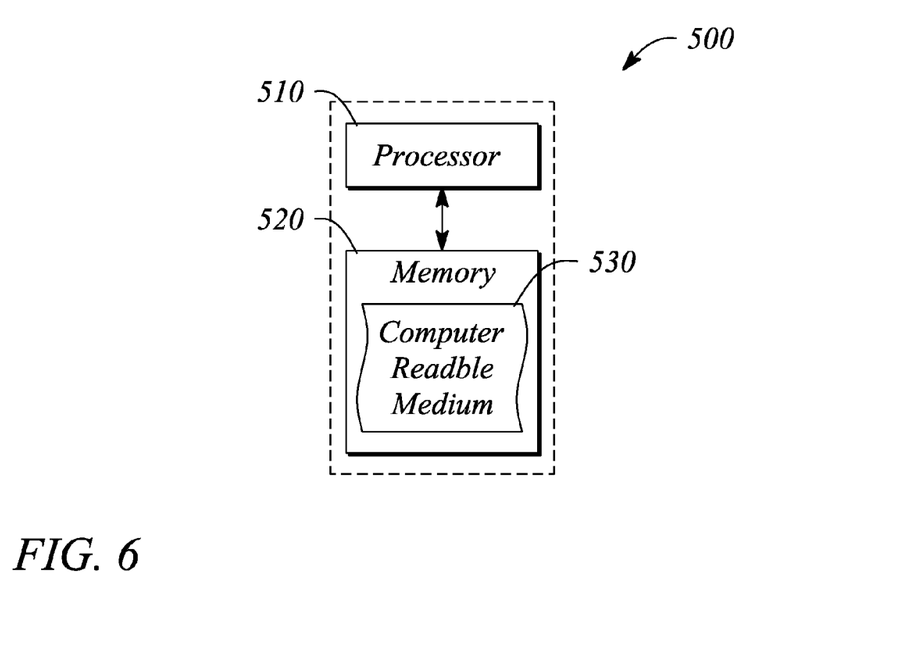
FIG. 6 illustrates a block diagram of a similarity search initialization system, according to another example consistent with the principles described herein.

FIG. 6 illustrates a block diagram of similarity search initialization system 500, according to an example consistent with the principles described herein. As illustrated in FIG. 6, the similarity search initialization system 500 comprises a processor 510 and memory 520. The processor 510 is configured to access the memory 520, as indicated by the double-headed arrow in FIG. 6. For example, the processor 510 may be a central processing unit (CPU) of a general-purpose computer. The processor 510 may be implemented as a microprocessor, for example. In another example, the processor 510 may be an embedded processor, microprocessor, or a related CPU in a device including, but not limited to, an application specific data processing system. In yet another example, the processor 510 may be a specialized processor such as, but not limited to, a signal processor.

The memory 520 may be any memory that is or may be accessed by the processor 510. For example, the memory 520 may be random access memory (RAM), read only memory (ROM), a magnetic or optical drive (e.g., computer hard disk) or another disk drive of a general-purpose computer that either includes or is connected to the processor 510. In another example, the memory 520 comprises removable media including, but not limited to, floppy disk, a compact disk (CD), a digital versatile disk (DVD), and a memory card (e.g., a USB flash drive). In some embodiments, one or both of the processor 510 and the memory 520 are implemented as an application specific integrated circuit (ASIC).

As illustrated in FIG. 6, the similarity search initialization system 500 further comprises a non-transient computer readable medium 530 encoded with instructions that, when executed by the processor 510, implement a similarity search initialization. In some examples, the memory 530 comprises the non-transient computer readable medium 530, as illustrated. For example, the non-transient computer readable medium 530 may be a portion of the memory 520 that is set aside for storing the instructions. In other examples (not illustrated), the non-transient computer readable medium 530 is separate from the memory 520. For example, the instructions on the non-transient computer readable medium 530 may be transferred to the memory 520 (e.g., by the processor 510) prior to being executed by the processor 510. The non-transient computer readable medium 530 may comprise a USB flash drive that is connected to the similarity search initialization system 500 for execution of the instructions.

According to various examples, the instructions encoded on the non-transient computer readable medium 530 that implement the similarity search when executed by the processor 510 comprise instructions that implement generating a suffix tree from a string comprising a target string representing a target sequence, and that implement identifying a longest prefix in the suffix tree that matches a suffix of a query string representing a query. The instructions may further comprise instructions that implement determining a distance between the query and a subsequence of the target sequence represented by a candidate substring of the target string. The determined distance produced by executing the instructions with the processor may provide an initial upper bound in a similarity search of the target sequence using the query, according to various examples.

In some examples, the instructions that implement generating the suffix tree may provide a functionality that is substantially similar to that of the suffix tree generator 130 described above with respect to the similarity search initialization system 100. In particular, the string comprising the target string may be a concatenation of the target string and the query string.

In some examples, the instructions that implement identifying a longest prefix may provide a functionality that is substantially similar to that of the leaf selector 110 described above with respect to the similarity search initialization system 100. In particular, when the string used in generating the suffix tree comprises the concatenation of the target string and the query string, the longest prefix that matches the query string suffix may be identified by selecting a leaf in the sub-tree rooted at the sibling of a leaf representing the query string suffix, in some examples.

In some examples, the instructions that implement determining a distance between the query and the subsequence may provide a functionality that is substantially similar to that of the distance module 120 described above with respect to the similarity search initialization system 100. In particular, in some examples, the candidate substring may be a substring starting at a location in the target string given by the sibling leaf minus a difference between the query string length and a length of the query string suffix.

Thus, there have been described examples of a similarity search initialization system, a method of similarity search initialization and a similarity search system that employ a suffix tree to provide an initial upper bound of a similarity search. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A similarity search initialization system comprising:
   a leaf selector implemented by a processor to select a leaf of a suffix tree generated from a target string representing a target sequence, the selected leaf being associated with a prefix in the suffix tree having a longest match to a suffix of a query string representing a query; and
   a distance module to determine a distance between the query and a subsequence of the target sequence that is represented by a candidate substring of the target string, the candidate substring comprising the prefix associated with the selected leaf,
   wherein the determined distance is to provide an initial upper bound in a similarity search of the target sequence using the query.

2. A similarity search initialization system of claim 1, further comprising a suffix tree generator to generate the suffix tree from a concatenation of the target string and the query string.

3. The similarity search initialization system of claim 2, wherein the selected leaf is a sibling leaf of a leaf of the suffix tree, the leaf representing the query string suffix, and wherein the candidate substring is a substring of the target string that begins at a location in the target string given by the selected leaf minus a difference between a length of the query string and a length of the query string suffix.

4. The similarity search initialization system of claim 3, wherein the selected leaf is a left-most sibling leaf of the leaf representing the query string suffix.

5. The similarity search initialization system of claim 1, wherein the target sequence is a time sequence.

6. The similarity search initialization system of claim 1, wherein the distance module is to determine the distance between the query and each subsequence of a plurality of subsequences of the target sequence corresponding to a respective one of a plurality of candidate substrings, each candidate substring comprising a different prefix of a plurality of prefixes associated with a corresponding plurality of selected leaves produced by the leaf selector with respect to a plurality of different query string suffixes, and wherein the determined distance used as the initial upper bound is a minimum of the determined distances.

7. The similarity search initialization system claim 1, further comprising a string quantizer to convert the target sequence into the target string and to convert the query into the query string, the target string and the query string each comprising a different termination symbol, wherein the termination symbols are not present in a finite symbol alphabet of the string quantizer.

8. A non-transient computer readable medium storing instructions that, when executed by a processor, implement the similarity search initialization system of claim 1, the instructions comprising:
  instructions that implement the leaf selector to select a leaf of a suffix tree; and
  instructions that implement the distance module to determine a distance between the query and the subsequence of the target sequence.

9. A similarity search system comprising the similarity search initialization system of claim 1, the similarity search system further comprising a similarity search engine to determine a distance between the query and the subsequence of the target sequence, the similarity search engine employing the initial upper bound provided by the similarity search initialization system to implement early abandonment during a distance determination of a similarity search.

10. A method of similarity search initialization, the method comprising:
  selecting a leaf of a suffix tree generated from a target string representing a target sequence stored in a memory, the selected leaf being associated with a prefix in the suffix tree having a longest match to a suffix of a query string representing a query; and
  executing a distance operator using a processor, the distance operator to determine a distance between the query and a subsequence of the target sequence represented by a candidate substring of the target string, the candidate substring comprising the prefix associated with the selected leaf as a suffix,
  wherein the determined distance is an initial upper bound in a similarity search of the target sequence using the query.

11. The method of similarity search initialization of claim 10, further comprising:
  generating the suffix tree from a concatenation of the target string and the query string,
  wherein the selected leaf is a sibling leaf of a leaf of the suffix tree, the leaf representing the query string suffix, and wherein the candidate substring is a substring that begins at a location in the target string given by the selected leaf minus a difference between a length of the query string and a length of the query string suffix.

12. The method of similarity search initialization of claim 10, wherein execution of the distance operator determines the distance between the query and each subsequence of a plurality of subsequences of the target sequence corresponding to respective ones of a plurality of candidate substrings, each candidate substring comprising a different prefix of a plurality of prefixes associated with a corresponding plurality of different query string suffixes, and wherein the determined distance used as the initial upper bound is a minimum of the determined distances.

13. The method of similarity search initialization of claim 10, further comprising:
  quantizing the target sequence to produce the target string, the target string comprising a first termination symbol that is not represented in a finite symbol alphabet used in quantizing; and
  quantizing the query to produce the query string, the query string comprising a second termination symbol that is not in the finite symbol alphabet used in quantizing, the second termination symbol being different from the first termination symbol,
  wherein the target sequence is a time sequence.

14. A non-transient computer readable medium encoded with instructions that, when executed by a processor, implement a similarity search initialization comprising instructions that implement:
  generating a suffix tree from a string comprising a target string representing a target sequence;
  identifying a longest prefix in the suffix tree that matches a suffix of a query string representing a query; and
  determining a distance between the query and a subsequence of the target sequence represented by a candidate substring of the target string, the candidate substring comprising the identified longest prefix as a suffix and having a length equal to the query string,
  wherein the determined distance provides an initial upper bound in a similarity search of the target sequence using the query.

15. A similarity search initialization system comprising the non-transient computer readable medium of claim 14, the search initialization system further comprising:
  a processor to execute the instructions encoded on the non-transient computer readable medium; and
  a memory to store the suffix tree and the determined distance,
  wherein the string used in generating the suffix tree comprises a concatenation of the target string and the query string, and wherein the instructions that implement identifying the longest prefix comprise instructions that implement selecting a leaf of the sub-tree rooted at the sibling of a leaf representing the query string suffix, and wherein the candidate substring is a substring starting at a location in the target string given by the sibling leaf minus a difference between the query string length and a length of the query string suffix.

* * * * *

UNITED STATES PATENT AND TRADEMARK OFFICE
CERTIFICATE OF CORRECTION

PATENT NO. : 8,972,415 B2  
APPLICATION NO. : 13/460015  
DATED : March 3, 2015  
INVENTOR(S) : Abdullah Al Mueen et al.

Page 1 of 1

It is certified that error appears in the above-identified patent and that said Letters Patent is hereby corrected as shown below:

In the Claims

In column 13, line 21, in Claim 7, delete "claim" and insert -- of claim --, therefor.

Signed and Sealed this
Eleventh Day of August, 2015

Michelle K. Lee
*Director of the United States Patent and Trademark Office*